United States Patent
Langhoff (12)

(10) Patent No.: US 9,126,553 B2
(45) Date of Patent: Sep. 8, 2015

(54) BUNK RESTRAINT SYSTEM

(75) Inventor: Richard V. Langhoff, Greensboro, NC (US)

(73) Assignee: VOLVO GROUP NORTH AMERICA, LLC, Greensboro, NC (US)

( * ) Notice: Subject to any disclaimer, the term of this patent is extended or adjusted under 35 U.S.C. 154(b) by 0 days.

(21) Appl. No.: 14/241,104

(22) PCT Filed: Sep. 20, 2011

(86) PCT No.: PCT/US2011/052322
§ 371 (c)(1),
(2), (4) Date: Feb. 26, 2014

(87) PCT Pub. No.: WO2013/043155
PCT Pub. Date: Mar. 28, 2013

(65) Prior Publication Data
US 2014/0230145 A1    Aug. 21, 2014

(51) Int. Cl.
*A47C 19/00* (2006.01)
*B60R 21/06* (2006.01)
*B60R 21/02* (2006.01)
*B60R 21/055* (2006.01)
*B60P 3/39* (2006.01)
*B60N 3/00* (2006.01)

(52) U.S. Cl.
CPC .............. *B60R 21/06* (2013.01); *B60N 3/008* (2013.01); *B60P 3/39* (2013.01); *B60R 21/026* (2013.01); *B60R 21/055* (2013.01)

(58) Field of Classification Search
CPC .... B62D 33/0612; B62D 33/06; A47C 17/80; B60R 21/06; B60R 2021/0034
USPC .............. 5/9.1, 118, 174, 283, 424, 425, 5/428–430; 280/748, 749; 296/190.01, 296/190.02, 190.03, 24.4, 24.43, 24.46
See application file for complete search history.

(56) References Cited

U.S. PATENT DOCUMENTS

| 666,566 | A | * | 1/1901 | Sherman | 182/96 |
| 1,887,301 | A | * | 11/1932 | Gordon | 182/36 |
| 2,839,765 | A | * | 6/1958 | Cogley | 5/425 |
| 3,008,534 | A | * | 11/1961 | Canon, Jr. | 182/106 |
| 5,003,650 | A | * | 4/1991 | Caya | 5/9.1 |

(Continued)

FOREIGN PATENT DOCUMENTS

| CN | 201509958 U | 6/2010 |
| GB | 04233 A | 0/1913 |

OTHER PUBLICATIONS

International search report and written opinion of corresponding PCT/US11/52322.

(Continued)

*Primary Examiner* — Timothy D Collins
*Assistant Examiner* — Richard G Davis
(74) *Attorney, Agent, or Firm* — Michael Pruden; Martin Farrell (57) ABSTRACT

The present invention relates to a vehicle bunk restraint system that includes a padded ladder restraint member and at least one other restraint member. The padded ladder restraint member provides access to an upper bunk. The padded ladder restraint member and at least one other restraint member may cooperate to obstruct the entrance to the lower bunk, whereby ejection from the lower bunk via the entrance is obstructed via the padded ladder restraint member and the at least one other restraint member.

13 Claims, 6 Drawing Sheets

(56) References Cited

U.S. PATENT DOCUMENTS

| | | | |
|---|---|---|---|
| 5,788,011 A * | 8/1998 | Kemmer et al. | 182/96 |
| 5,862,882 A | 1/1999 | Brady et al. | |
| 5,876,059 A * | 3/1999 | Kleinberg | 280/730.1 |
| 6,056,239 A | 5/2000 | Cantu et al. | |
| 6,223,363 B1 | 5/2001 | Sumlin | |
| 6,314,595 B1 | 11/2001 | Price | |
| 6,321,399 B1 * | 11/2001 | Walterscheid | 5/118 |
| 6,367,839 B1 | 4/2002 | Langhoff | |
| 6,464,288 B2 | 10/2002 | Moriaux | |
| 6,578,905 B1 | 6/2003 | Buchanan et al. | |
| 6,622,822 B1 * | 9/2003 | Langhoff et al. | 182/90 |
| 7,150,471 B2 | 12/2006 | Langhoff et al. | |
| 7,552,488 B2 * | 6/2009 | Martin et al. | 5/118 |
| 2002/0096913 A1 | 7/2002 | Moriaux | |
| 2004/0026168 A1 | 2/2004 | Buchanan et al. | |
| 2008/0282467 A1 | 11/2008 | Edwards | |

OTHER PUBLICATIONS

Extended European Search Report dated Mar. 4, 2015 for corresponding EP application No. 11872816.1.

* cited by examiner

BUNK RESTRAINT SYSTEM

FIELD OF THE INVENTION

The present invention relates to a restraint system for sleeping bunks and in particular to a restraint system that incorporates a ladder provided with an energy absorbing padding material.

BACKGROUND OF THE INVENTION

Moving vehicles, such as truck tractors, RVs, and trains may be provided with sleeping bunks. For example, a bunk arrangement in the sleeping berth of a truck tractor may include a lower bunk situated below an upper bunk that is accessible via a ladder.

In order to maintain an occupant in a bunk during the occurrence of an accident, a variety of restraint systems have been developed. Such restraint systems typically include straps, netting, harness, or mesh that when in use prevents an occupant from being ejected from the bunk. While effective for preventing an occupant from being ejected from the bunk and being injured as a result, many restraint systems extend over the occupant as they occupy the bunk and tend to limit the freedom of movement within the bunk, for example, by making it difficult to rest or sit up.

In part due to many restraint systems being somewhat cumbersome and inconvenient, occupants may sometimes fail to utilize them. Failure to utilize the restraint system, during a frontal crash, for example, may cause an occupant of the bunk to be ejected out of the bunk and into cabinets, seats, and other interior spaces of the vehicle and suffer serious injury or death.

The present invention relates to an improved bunk restraint system.

SUMMARY OF THE INVENTION

According to one embodiment of the present invention, a vehicle interior comprises a lower bunk, an upper bunk, and a restraint system. The lower bunk is provided with an entrance. The restraint system includes a padded ladder restraint member and at least one other restraint member. The padded ladder restraint member provides access to the upper bunk. The restraint system is provided with a restraining position whereat the padded ladder restraint member and at least one other restraint member cooperate to obstruct the entrance to the lower bunk, whereby ejection from the lower bunk via the entrance is obstructed via the padded ladder restraint member and the at least one other restraint member. The restraint system is provided with a non-restraining position whereat at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member.

According to another embodiment of the present invention, a method for providing access to and from a lower bunk of a vehicle interior and for maintaining an occupant in the lower bunk, wherein said vehicle interior includes the lower bunk, an upper bunk, and a restraint system that includes a padded ladder restraint member, which provides access to the upper bunk, and at least one other restraint member, the method comprises the steps of positioning the restraint system in a restraining position whereat the padded ladder restraint member and at least one other restraint member cooperate to obstruct the entrance to the lower bunk, whereby ejection from the lower bunk via the entrance is obstructed via the padded ladder restraint member and the at least one other restraint member and positioning the restraint system in a non-restraining position whereat at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member.

Aspects

According to one aspect of the present invention, a vehicle interior comprises:
 a lower bunk provided with an entrance;
 an upper bunk;
 a restraint system that includes a padded ladder restraint member and at least one other restraint member, wherein:
  the padded ladder restraint member provides access to the upper bunk;
  the restraint system is provided with a restraining position whereat:
   the padded ladder restraint member and at least one other restraint member cooperate to obstruct the entrance to the lower bunk, whereby ejection from the lower bunk via the entrance is obstructed via the padded ladder restraint member and the at least one other restraint member;
  the restraint system is provided with a non-restraining position whereat:
   at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member.

Preferably, padded ladder restraint member and at least one other restraint member are interconnected when the restraint system is in the restraining position.

Preferably, the at least one other restraint member includes at least one belt that is buckled during the restraining position and that may be unbuckled during the non-restraining position.

Preferably, the at least one other restraint member includes a padded restraint member.

Preferably, when the restraint system is in the non-restraining position, the padded ladder restraint member is stowed and removed from the entrance whereby ingress and egress into and out of the lower bunk via the entrance is unobstructed by the padded ladder restraint member.

Preferably, when the restraint system is in the non-restraining position, the at least one other restraint member is removed from at least a portion of the entrance whereby ingress and egress into and out of the lower bunk via the entrance is unhindered by the at least one other restraint member.

Preferably, when the restraint system is in the non-restraining position the padded ladder restraint member is stowed and removed from at least a portion of the entrance and the at least one other restraint member is unbuckled and removed from at least a portion of the entrance, whereby ingress and egress into and out of the lower bunk via the entrance is unobstructed by the padded ladder restraint member and the at least one other restraint member.

According to another aspect of the present invention, a method for providing access to and from a lower bunk of a vehicle interior and for maintaining an occupant in the lower bunk, wherein said vehicle interior includes the lower bunk, an upper bunk, and a restraint system that includes a padded ladder restraint member, which provides access to the upper bunk, and at least one other restraint member, the method comprising the steps of:

positioning the restraint system in a restraining position whereat the padded ladder restraint member and at least one other restraint member cooperate to obstruct the entrance to the lower bunk, whereby ejection from the lower bunk via the entrance is obstructed via the padded ladder restraint member and the at least one other restraint member; and positioning the restraint system in a non-restraining position whereat at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member.

Preferably, the step of positioning the restraint system in the restraining position whereat the padded ladder restraint member and at least one other restraint member cooperate to obstruct the entrance to the lower bunk, whereby ejection from the lower bunk via the entrance is obstructed via the padded ladder restraint member and the at least one other restraint member includes the step of interconnecting the padded ladder restraint member and at least one other restraint member.

Preferably, the at least one other restraint member includes at least one belt that is buckled when in the restraining position and that may be unbuckled when in non-restraining position.

Preferably, the at least one other restraint member includes a padded restraint member.

Preferably, the step of positioning the restraint system in the non-restraining position whereat at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member includes the step of stowing the padded ladder restraint member and removing the padded ladder restraint member from the entrance whereby ingress and egress into and out of the lower bunk via the entrance is unobstructed by the padded ladder restraint member.

Preferably, the step of positioning the restraint system in the non-restraining position whereat at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member includes the step of removing the at least one other restraint member from at least a portion of the entrance whereby ingress and egress into and out of the lower bunk via the entrance is unhindered by the at least one other restraint member.

DETAILED DESCRIPTION OF THE INVENTION

Figure 1:
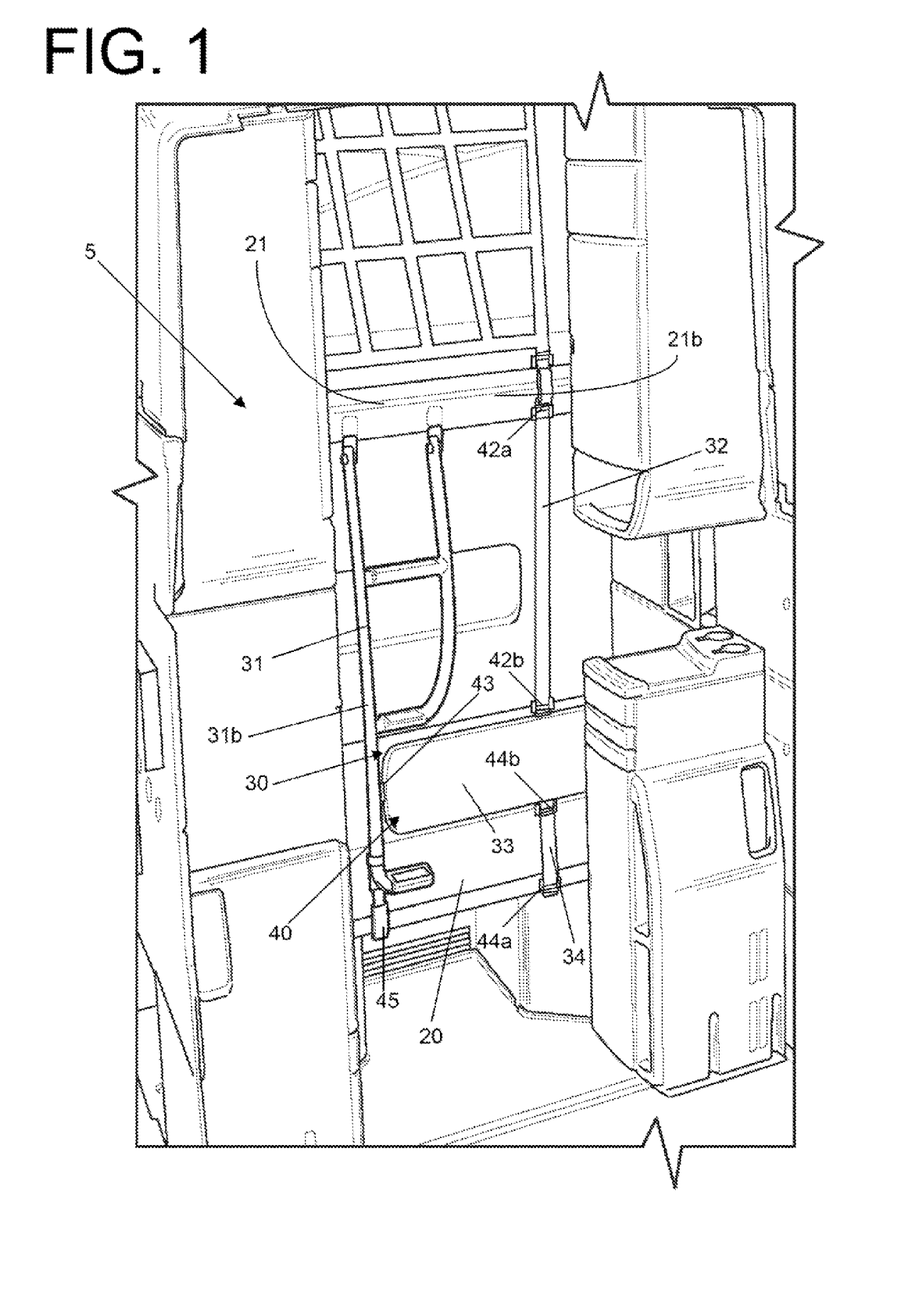
FIG. 1 depicts a perspective view of bunk restraint system according to one embodiment of the present invention showing the restraint system in a restraining position.
Figure 2:
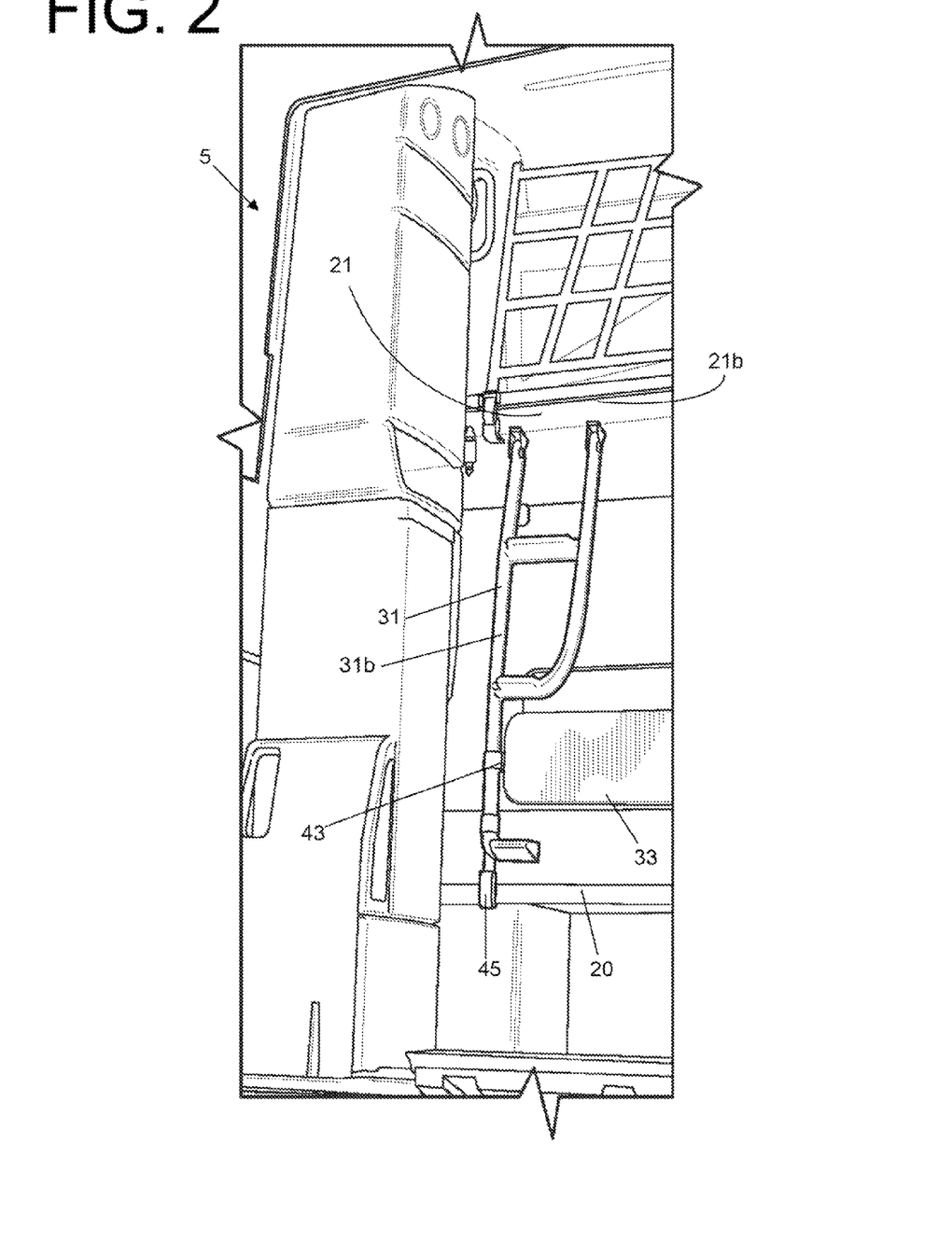
FIG. 2 depicts a perspective view of bunk restraint system according to one embodiment of the present invention showing the restraint system in a restraining position.
Figure 3:
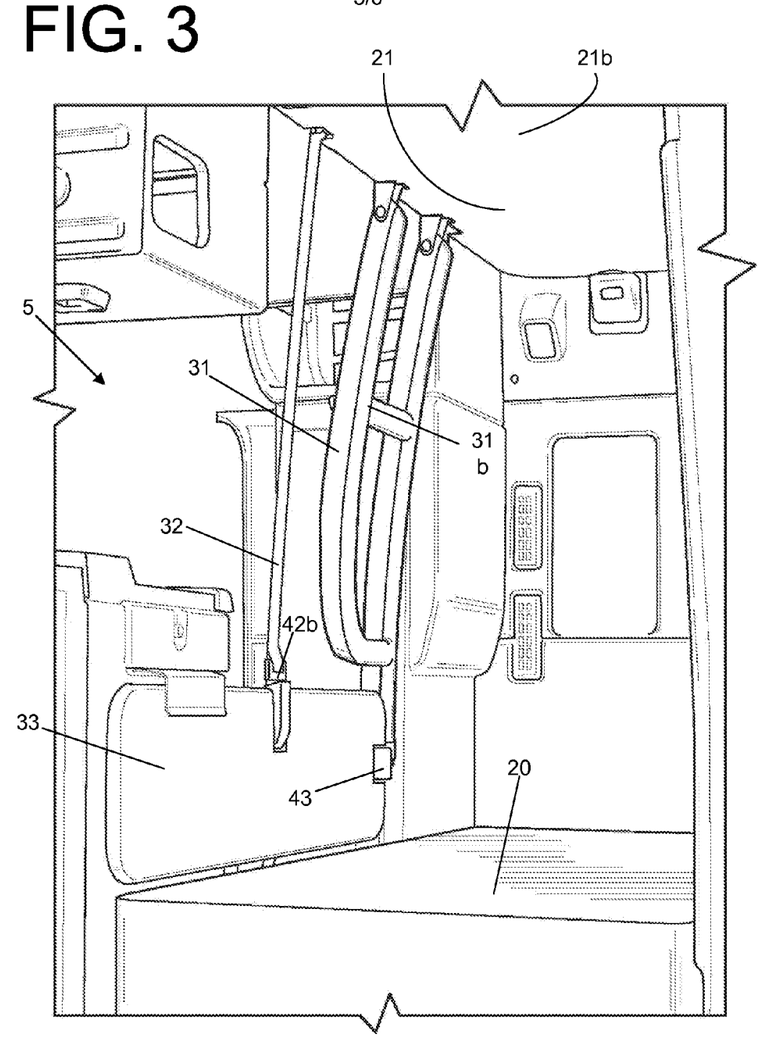
FIG. 3 depicts a perspective view of bunk restraint system according to one embodiment of the present invention showing the restraint system in a restraining position.
Figure 4:
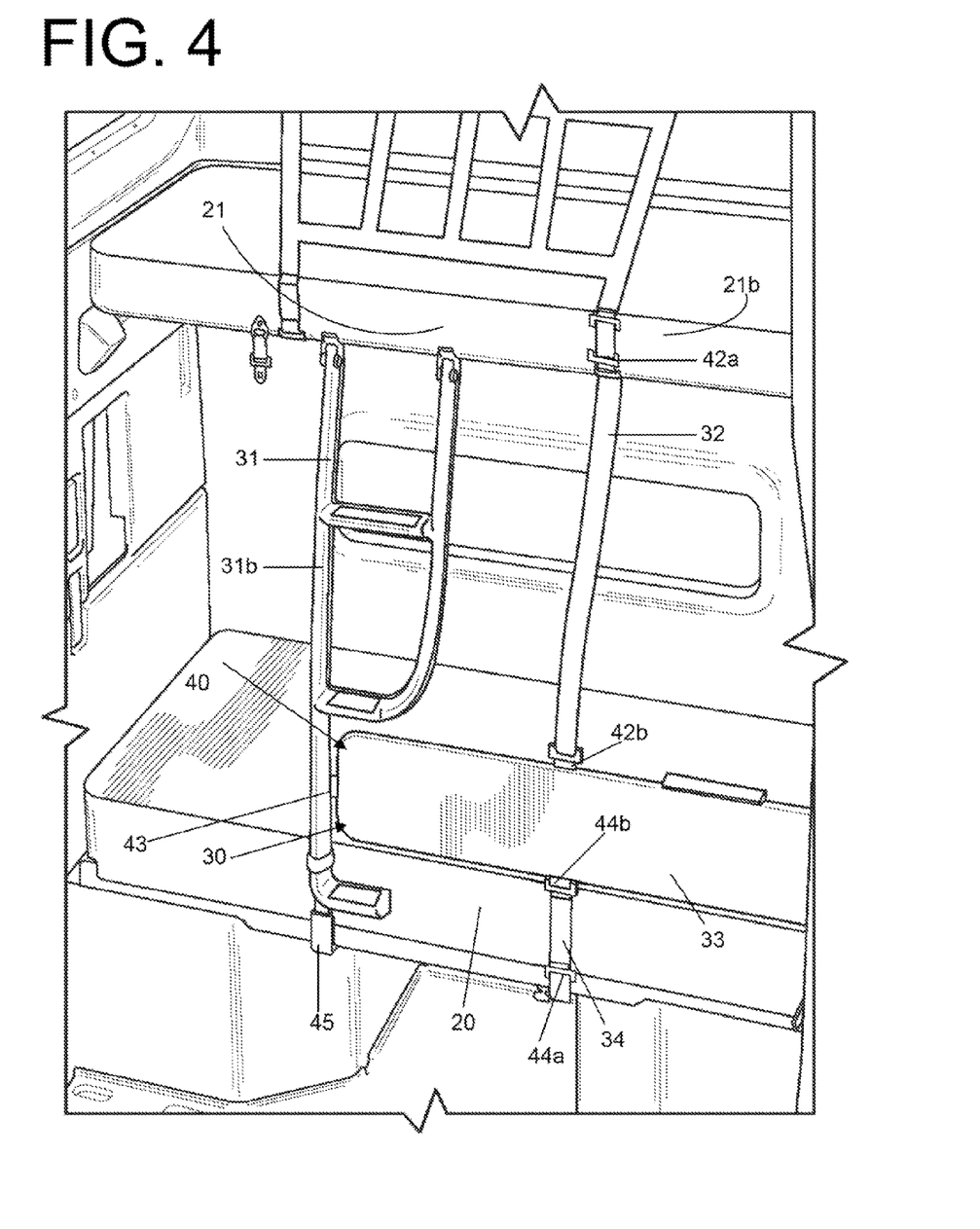
FIG. 4 depicts a perspective view of bunk restraint system according to one embodiment of the present invention showing the restraint system in a restraining position.
Figure 5:
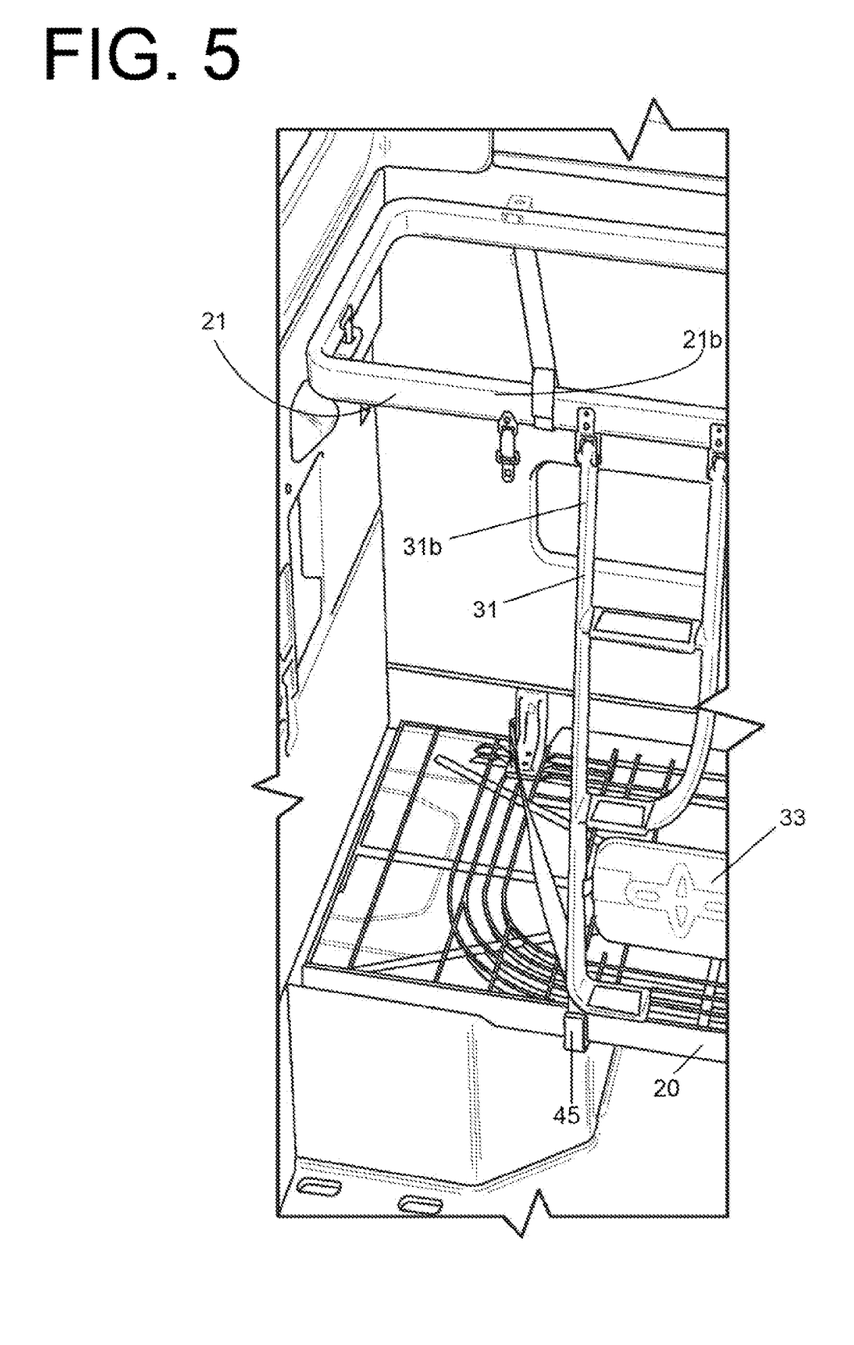
FIG. 5 depicts a perspective view of bunk restraint system according to one embodiment of the present invention showing the restraint system in a restraining position.
Figure 6:
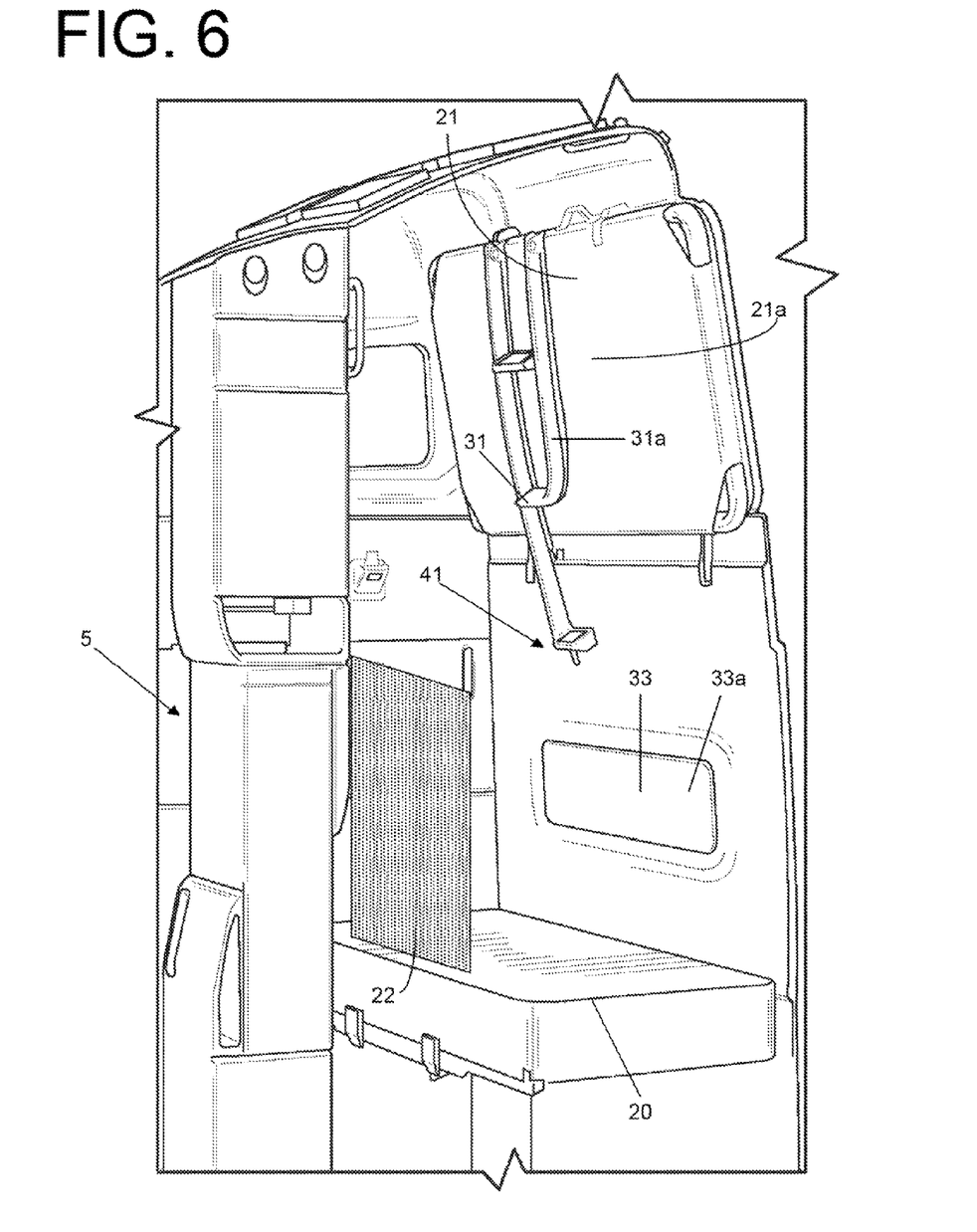
FIG. 6 depicts a perspective view of bunk restraint system according to one embodiment of the present invention showing the restraint system in a non-restraining position.

FIGS. 1-6 depict a vehicle interior 5, such as, for example, the vehicle interior 5 of a truck tractor. As shown, the vehicle interior 5 is provided with a lower bunk 20 and an upper bunk 21. As shown in FIG. 6, the lower bunk is provided with an entrance 22. Also shown in FIG. 1, the vehicle interior 5 is provided with a restraint system 30 that includes a padded ladder restraint member 31 and at least one other restraint member, including, such as, for example, restraint belt member 32, padded restraint member 33, and restraint belt member 34.

According to one aspect of the present embodiment, the restraint system 30 is provided with a restraining position 40. According to another aspect of the present embodiment, as shown in FIGS. 1-5, when in the restraining position 40, the padded ladder restraint member 31 and at least one other restraint member, such as, 32, 33, and/or 34, cooperate to obstruct the entrance 22 to the lower bunk 21, whereby ejection from the lower bunk 21 via the entrance 22 is obstructed via the padded ladder restraint member 31 and the at least one other restraint member, such as 32, 33, and/or 34.

As shown in FIGS. 1-5, when in the restraining position 40, the restraint belt members 32, 34 may be buckled as at 42a, 44a and may interconnect with other restraint members, such as, for example, by buckling, with the padded restraint member 33 as shown at 42b, 44b. Similarly, when in the restraining position, the padded restraint member 33 and padded ladder restraint member may interconnect, such as, for example by buckling, as at 43. Also shown, the lower end of the ladder may be secured to the lower bunk 20, as at 45, such as, for example by buckling.

According to another aspect of the present embodiment, the restraint system is provided with a non-restraining position 41. According to yet another aspect of the present embodiment, as shown in FIG. 6, when in the non-restraining position 41, at least one of the padded ladder restraint member 31 and the at least other one restraint member, such as 32, 33, and/or 34, are positioned so that at least a portion of the entrance 22 of the lower bunk is unobstructed, whereby ingress and egress into and out of the lower bunk 20 via the at least a portion of the entrance 22 is unobstructed by at least one of the padded ladder restraint member 31 and the at least one other restraint member, such as, 32, 33, and/or 34. As shown in FIG. 6, when in the non-restraining position 41, the padded ladder restraint member 31 and restraining pad member 33 (with or without the restraint belt member(s) 32 and/or 34) may be moved to stowed positions 31a and 33b and the padded ladder restraint member 31, restraint belt member 32, padded restraint member 33, and restraint belt member 34 may be unbuckled.

According to yet another aspect of the present embodiment, the restraint system 30 is configured to provide access for the upper bunk 21. According to yet another aspect of the present embodiment, the padded ladder restraint member 31 is configured to provide access for the upper bunk 20. FIGS. 1-5 depict the padded ladder restraint member 31 in a deployed position 31b and the upper bunk 21 in a deployed position 21b. As shown, when in the deployed position, the padded ladder restraint member 31 extends downward from the deployed upper bunk 21 whereby the upper bunk 21 is accessible by traveling up the padded ladder restraint member 31.

Advantageously, when in the deployed position 31b, the padded ladder restraint member 31 may still provide a minimum level of impact protection for occupants of the lower bunk 20 during a crash, even if the restraint system 30 is not fully deployed in the restraining position 40, such as, for example when the ladder is deployed, but at least one other restraint member, including, such as, for example, restraint belt member 32, padded restraint member 33, or restraint belt member 34, are unbuckled or stowed. Accordingly, should an occupant fail to fully deploy the restraint system 20, the ladder 31 may prevent an occupant from being ejected out of the bunk and into cabinets, seats, and other interior spaces of the vehicle.

In the preferred embodiment, the ladder is padded with an energy absorbing padding material, such as, for example, and not limitation, expanded polypropylene foam (EPP). Although it is within the scope of the present invention to pad the entire ladder 30 with an energy absorbing material, within the scope of the present invention, it is also within the scope of the present invention to pad less than the entirety of the ladder, including, such as, by way of example, portions of the ladder that are unlikely to contact an occupant of the lower bunk 20 in the event of the crash, such as for example, the bunk facing side 30b of the ladder.

The present description depicts specific examples to teach those skilled in the art how to make and use the best mode of the invention. For the purpose of teaching inventive principles, some conventional aspects have been simplified or omitted. The detailed descriptions of the above embodiments are not exhaustive descriptions of all embodiments contemplated by the inventors to be within the scope of the invention. By way of example, and not limitation, although the present embodiment depicts an exemplary vehicle interior 5 with a stowable upper bunk 21 and a stowable ladder 20, in alternative embodiments the upper bunk 21 and/or stowable ladder 20 may be fixed. By way of another example, although an exemplary restraint system 30 is shown with a padded ladder restraint member 31 and restraint belt member 32, padded restraint member 33, and restraint belt member 34, in alternative embodiments the ladder 31 may cooperate with any type and number of additional restraint members including belts, straps, pads, meshes, nets, etc with a variety of shapes and configurations. By way of yet another example, although one example of a padded ladder 31 has been depicted in the figures, the padded ladder may be provided with a multitude of shapes and configurations. By way of yet another example, although the restraint system 30 has been described in the context of a truck tractor, it is within the scope of the present invention to utilize the restraint system 30 on other vehicles, including, such as, for example, trains and RVs.

Those skilled in the art will appreciate variations from these examples that fall within the scope of the invention. Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

I claim:

1. A vehicle interior, comprising:
a lower bunk provided with an entrance;
an upper bunk;
a restraint system that includes a padded ladder restraint member provided with a bunk facing side that is padded and at least one other restraint member, wherein:
the padded ladder restraint member provides access to the upper bunk;
the restraint system is provided with a restraining position whereat:
the padded ladder restraint member and at least one other restraint member cooperate to obstruct the entrance to the lower bunk, whereby ejection from the lower bunk via the entrance is obstructed via the padded ladder restraint member and the at least one other restraint member;
the restraint system is provided with a non-restraining position whereat:
at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member.

2. The vehicle interior according to claim 1, wherein the padded ladder restraint member and at least one other restraint member are interconnected when the restraint system is in the restraining position.

3. The vehicle interior according to claim 1 wherein the at least one other restraint member includes at least one belt that is buckled during the restraining position and that may be unbuckled during the non-restraining position.

4. The vehicle interior according to claim 1 wherein the at least one other restraint member includes a padded restraint member.

5. The vehicle interior according to claim 1, wherein when the restraint system is in the non-restraining position, the padded ladder restraint member is stowed and removed from the entrance whereby ingress and egress into and out of the lower bunk via the entrance is unobstructed by the padded ladder restraint member.

6. The vehicle interior according to claim 1, wherein when the restraint system is in the non-restraining position, the at least one other restraint member is removed from at least a portion of the entrance whereby ingress and egress into and out of the lower bunk via the entrance is unhindered by the at least one other restraint member.

7. The vehicle interior according to claim 1, wherein when the restraint system is in the non-restraining position the padded ladder restraint member is stowed and removed from at least a portion of the entrance and the at least one other restraint member is unbuckled and removed from at least a portion of the entrance, whereby ingress and egress into and out of the lower bunk via the entrance is unobstructed by the padded ladder restraint member and the at least one other restraint member.

8. A method for providing access to and from a lower bunk of a vehicle interior and for maintaining an occupant in the lower bunk, wherein said vehicle interior includes the lower bunk, an upper bunk, and a restraint system that includes a padded ladder restraint member, provided with a bunk facing side that is padded and which provides access to the upper bunk, and at least one other restraint member, the method comprising the steps of:
    positioning the restraint system in a restraining position whereat the padded ladder restraint member and at least one other restraint member cooperate to obstruct the entrance to the lower bunk, whereby ejection from the lower bunk via the entrance is obstructed via the padded ladder restraint member and the at least one other restraint member; and
    positioning the restraint system in a non-restraining position whereat at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member.

9. The method according to claim 8, wherein the step of positioning the restraint system in the restraining position whereat the padded ladder restraint member and at least one other restraint member cooperate to obstruct the entrance to the lower bunk, whereby ejection from the lower bunk via the entrance is obstructed via the padded ladder restraint member and the at least one other restraint member includes the step of interconnecting the padded ladder restraint member and at least one other restraint member.

10. The method according to claim 8, wherein the at least one other restraint member includes at least one belt that is buckled when in the restraining position and that may be unbuckled when in non-restraining position.

11. The method according to claim 8, wherein the at least one other restraint member includes a padded restraint member.

12. The method according to claim 8, wherein the step of positioning the restraint system in the non-restraining position whereat at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member includes the step of stowing the padded ladder restraint member and removing the padded ladder restraint member from the entrance whereby ingress and egress into and out of the lower bunk via the entrance is unobstructed by the padded ladder restraint member.

13. The method according to claim 8, whereat the step of positioning the restraint system in the non-restraining position whereat at least one of the padded ladder restraint member and the at least other one restraint member are positioned so that at least a portion of the entrance of the lower bunk is unobstructed, whereby ingress and egress into and out of the lower bunk via the at least a portion of the entrance is unobstructed by at least one of the padded ladder restraint member and the at least one other restraint member includes the step of removing the at least one other restraint member from at least a portion of the entrance whereby ingress and egress into and out of the lower bunk via the entrance is unhindered by the at least one other restraint member.

* * * * *